Aug. 9, 1938.   C. E. REED   2,126,041
ROLLER CUTTER AND SPINDLE ASSEMBLY FOR EARTH BORING DRILLS
Filed Sept. 24, 1937
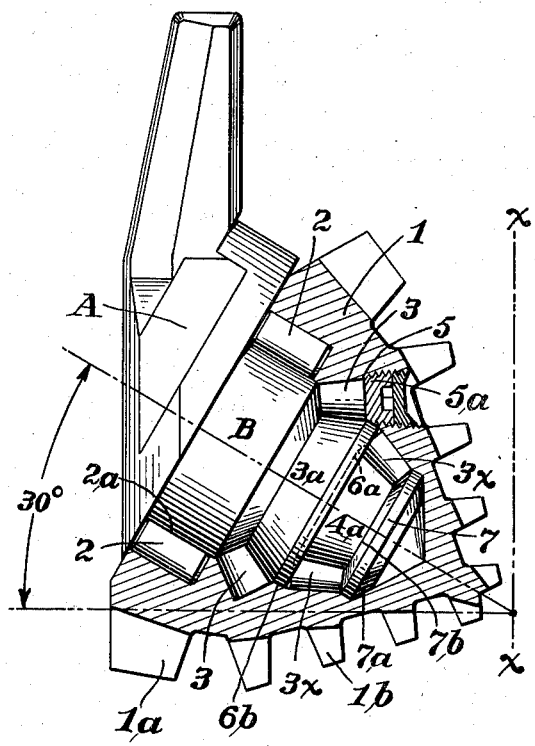
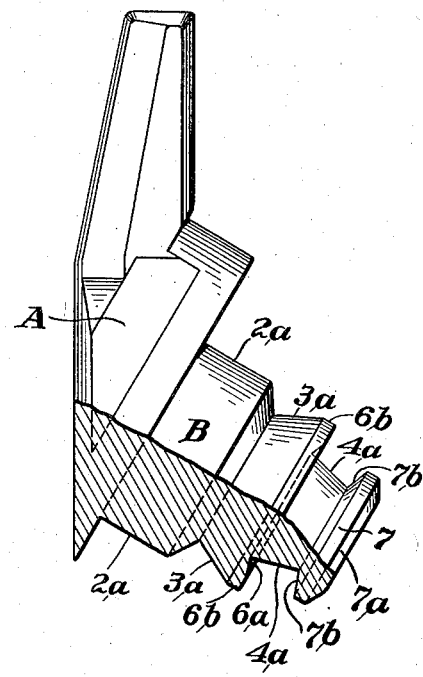
Inventor:
Clarence E. Reed, Patented Aug. 9, 1938

2,126,041

UNITED STATES PATENT OFFICE 2,126,041

ROLLER CUTTER AND SPINDLE ASSEMBLY FOR EARTH BORING DRILLS

Clarence E. Reed, Wichita, Kans., assignor to Chicago Pneumatic Tool Company, New York, N. Y., a corporation of New Jersey Application September 24, 1937, Serial No. 165,582

11 Claims. (Cl. 255—71)

The invention is an improvement upon the general form of earth boring bits employing frusto-conical anti-friction roller bearings.

The invention consists in the features and combination and arrangement of parts disclosed herein and particularly pointed out in the appended claims.

In the drawing,

Figure 1 is a central vertical sectional view of the cutter with the spindle, support and roller bearing organization shown partly in side elevation.

Fig. 2 is a view of the spindle detached and partly in section.

Referring to the drawing, the roller cutter 1 is of frusto-conical form, having a toothed base cutting zone 1a and a toothed frusto-conical apex cutting zone 1b. The invention is not limited to a frusto-conical cutter form. Cylindrical cutter form may be employed.

The two zones of the frusto-conical form of cutter are at an inclination to each other. The teeth of the base zone are comparatively wide and extend in planes radial from the axis of the cutter. The teeth of the frusto-conical apex zone are arranged in widely spaced apart circumferential rows. The cutter is in one piece.

It is well known in the art that a cylindrical cutter form rolling in a circular path on the bottom of the bore hole has a non-true rolling action resulting in the so-called "twisting" or scraping action on the formation at the bottom of the hole. A frusto-conical cutter form having a base cutting zone inclined to a frusto-conical apex cutting zone has similar "twisting" action of the cutter teeth, but modified in extent. The inclination of the cutter axis also modifies the cutting action possible to obtain in any given cutter.

In this invention, using a frusto-conical cutter form as shown in Fig. 1, the cutter axis is set at an inclination of thirty (30) degrees, as indicated on the drawing, which enables the use of a larger diameter frusto-conical cutter than has heretofore been used in frusto-conical cutter bits of this type. This setting of the axis of the cutter intensifies certain thrusts imposed upon the cutter in operation. The cutter teeth have greater differential of speed of travel, therefore of contact with the surface of bottom of hole in the different rows of teeth, and much greater and more rapid disintegration of the bottom of the bore hole results. The thrusts have been very severe on the bearings, particularly the end portion of the bearing towards the drill axis. The drill axis is indicated on the drawing by the line $x$—$x$. The usual form of bearing breaks down much too soon for efficient and sustained maintenance of the cutting capacity of the teeth.

In this invention frusto-conical roller bearings are employed in two sets, spaced apart sets, 3 and $3x$, the bearings of set 3 having their larger ends positioned inwardly towards the axis of the drill and tapering towards the outer side of the drill, and those of set $3x$ having their larger diameter ends facing outwardly towards the support A of the unit. The bearing is thus increased in size and the thrusts tending to push the top portion of the cutter towards the drill axis are sustained by these tapered roller bearings, which also serve to rotatively lock the cutter on the spindle.

It will be noted that the spindle and support are integral, the cutter is in one piece and that all raceways are smooth, unbroken, uninterrupted surfaces throughout their extent.

The cutter encloses the end of the spindle and presents a difficult problem of assembly solved by the arrangement of the parts of this invention.

As shown in the drawing, the spindle B is integrally formed with its base or support, which has a shank extending upwardly to fit into a recess in the bit head, not shown, wherein it is suitably secured, as, for instance, by welding.

The spindle has a cylindrical raceway surface $2a$ thereon, also a frusto-conical raceway surface $3a$ and another frusto-conical raceway surface $4a$, an undercut shoulder $6a$ and a flange 7, the latter having a thrust shoulder $7a$ which forms a friction bearing surface contacting a friction bearing surface of the cutter. The flange 7 retains the rollers $3x$ in position.

Cylindrical anti-friction rollers 2 are mounted on the raceway $2a$, as will be understood from the above. Frusto-conical rollers 3 are mounted on the raceway $3a$ and frusto-conical rollers $3x$ are positioned on the raceway $4a$.

The frusto-conical cutter has a bore conforming generally to the configuration of the spindle and anti-friction members above described. That is to say, it has a bore with raceway surfaces complementary to the raceway surfaces on the spindle, and a thrust, frictional bearing surface. The cutter has a bore hole 5, closed by a plug $5a$. This bore hole is at an inclination to the axis of the spindle and registers with the frusto-conical space between the raceway $3a$ of the spindle and the complementary cutter frusto-conical raceway surface. The frusto-conical roller bearings 3 are inserted through this hole to their operating position, after which the hole is plugged. The plug 5a serves only to close the open hole, and has no other operating function, than to keep earth from entering. After the tapered rollers are inserted to their operating position between the frusto-conical raceway surfaces on the cutter and on the spindle, the interrelation of all parts is such that the cutter cannot come off the spindle because of compression of the tapered rollers through their peripheries contacting cutter and spindle. Holes through cutter shells have been used in this industry for inserting balls and rollers, but they are heretofore used in such manner that the operating loads imposed on the cutter had to be sustained in whole or in part by the plug which would loosen because it formed a part of the raceway. In this assembly the position of the hole and the angle of its inclination to the raceway is such that the operating thrusts on the tapered roller bearings 3 cannot be transmitted to the plug.

In assembling the organization, the cylindrical rollers 2 and the frusto-conical rollers 3x are placed on their respective raceway surfaces and the cutter is then positioned on the spindle and the cylindrical and frusto-conical rollers 2 and 3x. The tapered rollers 3 are then inserted one at a time through the hole 5 and after all are in place, the plug 5a is inserted in the hole. The plug may be screw threaded, or welded, or both, to retain it.

It is of course well known that in the usual frusto-conical roller cutters there is a well defined end thrust of the cutter towards the support. Such end thrust varies directly with the angle of inclination of the cutter axis. In this invention and in combination with the assembly and the arrangement of the parts, the angle of inclination has been reduced from the usual 38 to 42.5 degrees to approximately 30 degrees, and this position of the frusto-conical cutter is so much more nearly approaching the vertical, that the thrusts of operation which tend to rotate the body of the cutter by pushing inwardly or outwardly axially are so much modified from the heretofore usual conditions that the general average conditions result in the end thrusts being largely reversed in direction. That is to say, the destructive, predominating end thrusts of the operations as they affect the body of the cutter tend to push it towards the axis of the drill to such extent that the end thrust bearing should be reversed from the usual practice. Therefore, in this invention, the main rolling end thrust bearing 3 of the structure is positioned to sustain end thrust of the cutter towards the drill axis, and the end thrust of the cutter that may occur towards the support outwardly from the drill axis, is sustained by frusto-conical roller bearings 3x and by the friction bearing 7a on the spindle. Sufficient clearance is allowed at the inner ends of the rollers 2 so that the rollers will not be in compression endwise; the frusto-conical rollers 3x are shielded against outward endwise compression by the flange 7 having the inclined outer shoulder 7b against which the smaller end faces of the said rollers 3x bear and they are shielded against endwise compression inwardly by shoulder 6a and its annular continuation 6b which extends to the full diameter of the larger end of the raceway 3a. These frusto-conical roller bearings 3 and 3x take end thrust of the cutter upon their peripheries. The friction bearing surface or shoulder 7a also takes end thrust of the cutter and thus aids in relieving the roller bearings of endwise compression. Both sets of frusto-conical rollers sustain radial loads in addition to end thrusts of the cutter.

I claim:

1. A roller cutter and rolling bearing assembly for earth boring drills revoluble about the vertical axis of the drill, comprising a roller cutter, a spindle, and roller bearings between the cutter and spindle in three sets, one of which sets being of cylindrical form located at one end of the roller cutter, the other two sets being arranged adjacent the other end of the cutter, each composed of frusto-conical rollers, those of one set having their larger diameter ends facing towards the vertical axis of the drill, and those at the other set having their larger diameter ends facing towards the opposite end of the cutter at which the cylindrical roller bearings are located, and complementary raceway surfaces on the spindle and cutter for said roller bearings.

2. In combination in an earth boring drill, revoluble about a vertical axis, a spindle, a roller cutter, two sets of frusto-conical roller bearings between the spindle and roller cutter, said sets being adjacent each other, those of one set having their larger diameter ends facing towards the vertical axis of the drill, and those of the other set having their larger diameter ends facing substantially in the opposite direction, rolling bearings off to one side of said sets of frusto-conical roller bearings, and raceways on the spindle and cutter for said bearings.

3. A spindle and roller cutter assembly according to claim 2 in which the off-side positioned rolling bearings are cylindrical rollers, taking radial loads of the cutter, said sets of frusto-conical roller bearings taking on their peripheries radial and end thrusts of the cutter both inwardly and outwardly relative to the vertical axis of the drill.

4. In combination in an earth boring drill revoluble about the vertical axis of the drill, a spindle inclining downwardly and inwardly towards said vertical axis and having a support at its outer end, and with its inner end free, a frusto-conical roller cutter enclosing said spindle at its free end, cylindrical roller bearings adjacent the support and arranged between the spindle and the base of said roller cutter, and two sets of frusto-conical roller bearings between the spindle and the roller cutter located at zones between the cylindrical roller bearings and the free end of the spindle, the roller bearings of one set having their larger end faces directed towards the said vertical axis and the roller bearings of the other set having their larger diameter end faces directed outwardly towards the support, said frusto-conical rollers taking radial loads, those of the set having their larger end faces directed inwardly towards the vertical axis of the drill taking upon their peripheries end thrust of the roller cutter inwardly towards the vertical axis of the drill and the other set taking upon their periphery end thrusts of the cutter outwardly towards the support, substantially as described.

5. An earth boring drill according to claim 4 in which those frusto-conical roller bearings which have their larger diameter faces directed outwardly towards the spindle support and take end thrust of the cutter outwardly are located nearer the free end of the spindle than the other set of frusto-conical roller bearings, substantially as described.

6. An earth boring drill revoluble about a vertical axis comprising a spindle and a roller cutter turnable thereon, said spindle having an inner end directed towards the vertical axis of the drill, a set of frusto-conical roller bearings adjacent the said inner end of the spindle having their larger end faces directed outwardly from said vertical axis of the drill and another set of frusto-conical roller bearings which are located more distant from the vertical axis of the drill than the set first mentioned and having their larger end faces directed inwardly towards the vertical axis of the drill, both sets of roller bearings taking radial loads, the set of roller bearings located adjacent the inner end of the spindle taking on their peripheries end thrust of the cutter in a direction outwardly from the vertical axis of the drill and said another set of roller bearings taking on their peripheries end thrust of the roller cutter in a direction towards said vertical axis, said spindle and roller cutter having complementary frusto-conical raceways on which said roller bearings turn, substantially as described.

7. A spindle of an earth boring drill for revolubly supporting a roller cutter, said spindle having a pair of frusto-conical raceways with their larger diameter ends adjacent to each other and with an undercut annular shoulder between said adjacent ends, substantially as described.

8. A spindle for supporting a roller cutter of an earth boring drill having a free end and a support at its other end, a frusto-conical raceway on said spindle having its larger diameter end facing towards the free end of the spindle with an annular undercut shoulder at said larger diameter end, said spindle having a second frusto-conical raceway the larger diameter end of which is adjacent the larger diameter end of the raceway first mentioned, and emanates from the inner edge of said shoulder, substantially as described.

9. A spindle for an earth boring drill having a free end and a support at its other end, said spindle having a cylindrical raceway adjacent the support, a frusto-conical raceway tapering towards said cylindrical raceway, a second frusto-conical raceway adjacent the frusto-conical raceway first mentioned and tapering towards the free end of the spindle, the larger diameter end of said second mentioned frusto-conical raceway being of smaller diameter than the larger diameter end of the first mentioned frusto-conical raceway, thus providing an annular shoulder between the larger diameter ends of the frusto-conical raceways, and an annular flange at the free end of the spindle, and at the smaller diameter end of the second mentioned frusto-conical raceway, substantially as described.

10. A roller cutter for an earth boring drill of frusto-conical form having within its bore open at its base and closed at its apex, the following formation: a cylindrical raceway surface at its base; a frusto-conical raceway surface tapering towards the larger diameter end of said cutter; a second frusto-conical raceway surface tapering towards the apex of the cutter, and a frictional bearing surface in the apex end of said cutter.

11. In combination in a roller cutter and spindle assembly for earth boring drills revoluble about a vertical axis, a frusto-conical roller cutter, a one piece spindle, frusto-conical roller bearings in two sets between the spindle and roller cutter, the roller bearings of the first set which lie nearer to the apex of the cutter having their larger ends directed towards the larger diameter end of the roller cutter and the roller bearings of the second set having their larger diameter ends directed inwardly towards the vertical axis of the drill, complementary raceways on the spindle and in the cutter for said sets of roller bearings, said roller cutter having an opening through its wall axially in line at one point with the tapered space between the complementary raceways of the second mentioned roller bearings, for their insertion into place, a closure for said opening, the said roller cutter being adapted to be placed by a movement axially of the spindle to contact with the roller bearings of the first mentioned set.

CLARENCE E. REED.